US010116073B2

(12) United States Patent
Washino et al.

(10) Patent No.: US 10,116,073 B2
(45) Date of Patent: Oct. 30, 2018

(54) BOARD-TO-BOARD CONNECTOR FOR ABSORBING MISALIGNMENT

(71) Applicant: J.S.T. Mfg. Co., Ltd., Osaka-shi (JP)

(72) Inventors: Kiyoshi Washino, Yokohama (JP); Koji Iwashita, Yokohama (JP); Daizou Imoto, Yokohama (JP); Hideki Takeshima, Yokohama (JP)

(73) Assignee: J.S.T. MFG. CO., LTD., Osaka-shi (JP)

(*) Notice: Subject to any disclaimer, the term of this patent is extended or adjusted under 35 U.S.C. 154(b) by 0 days.

(21) Appl. No.: 15/861,106

(22) Filed: Jan. 3, 2018

(65) Prior Publication Data

US 2018/0198222 A1 Jul. 12, 2018

(30) Foreign Application Priority Data

Jan. 11, 2017 (JP) ................................ 2017-002430

(51) Int. Cl.
*H01R 12/71* (2011.01)
*H01R 12/91* (2011.01)
(Continued)

(52) U.S. Cl.
CPC ........... *H01R 12/716* (2013.01); *H01R 12/91* (2013.01); *H01R 12/58* (2013.01); *H01R 13/41* (2013.01); *H01R 13/6315* (2013.01)

(58) Field of Classification Search
CPC ...... H01R 12/716; H01R 12/91; H01R 12/58; H01R 13/41
(Continued)

(56) References Cited

U.S. PATENT DOCUMENTS 2,410,287 A * 10/1946 Jaberg .................... H01R 24/76 174/53
2,433,917 A * 1/1948 McCartney .......... H01R 25/006 174/50
(Continued)

FOREIGN PATENT DOCUMENTS

EP 2947721 A2 11/2015
JP 2009-230944 A 10/2009
(Continued)

OTHER PUBLICATIONS

European Search Report issued to EP Patent Application No. 17210892.0, dated Apr. 26, 2018.

*Primary Examiner* — Alexander Gilman
(74) *Attorney, Agent, or Firm* — Kratz, Quintos & Hanson, LLP

(57) ABSTRACT

A board-to-board connector can electrically connect a first printed circuit board having a receptacle mounted thereon to a second printed circuit board having a plug mounted thereon. The receptacle includes a first housing and three first contacts and the plug includes a second housing and three second contacts. The first housing includes a concave portion and a first contact accommodation chamber. The concave portion can be fitted to the plug. The first contact accommodation chamber can accommodate a winding portion of the first contact. In the first contact, a lead terminal is fixed to the first printed circuit board and a contact terminal is fixed to the first housing. In the first contact, the first housing is movably supported by the winding portion with respect to the first printed circuit board.

14 Claims, 16 Drawing Sheets

(51) Int. Cl.
*H01R 13/631* (2006.01)
*H01R 13/41* (2006.01)
*H01R 12/58* (2011.01)

(58) Field of Classification Search
USPC .......................................................... 439/660
See application file for complete search history.

(56) References Cited

U.S. PATENT DOCUMENTS

| | | | | | |
|---|---|---|---|---|---|
| 2,920,303 | A * | 1/1960 | Johnson | H01R 4/2483 174/53 |
| 3,922,478 | A * | 11/1975 | Perkey | H01R 24/76 174/53 |
| 4,103,125 | A * | 7/1978 | Marrero | H01R 24/76 200/51 R |
| 4,165,443 | A * | 8/1979 | Figart | H02G 3/16 174/53 |
| 4,924,032 | A * | 5/1990 | Akins | H02G 3/00 174/53 |
| 4,958,048 | A * | 9/1990 | Bell | H02G 3/125 174/53 |
| 5,525,754 | A * | 6/1996 | Akins | H01R 4/4827 174/53 |
| 7,034,422 | B2 * | 4/2006 | Ramu | H02K 1/246 310/112 |
| 7,572,976 | B1 * | 8/2009 | Merrill | H01R 9/2408 174/17 R |
| 7,862,345 | B2 | 1/2011 | Fukazawa | |
| 7,887,350 | B2 * | 2/2011 | Fukazawa | H01R 12/707 439/247 |
| 8,888,506 | B2 * | 11/2014 | Nishimura | H01R 12/7082 439/74 |
| 9,160,122 | B2 * | 10/2015 | Sato | H01R 12/91 |
| 9,225,089 | B2 * | 12/2015 | Sato | H01R 4/028 |
| 9,246,283 | B2 * | 1/2016 | Sato | H01R 24/60 |
| 9,356,371 | B2 * | 5/2016 | Goto | H01R 12/73 |
| 9,406,456 | B2 * | 8/2016 | O'Keeffe | H04W 4/21 |
| 9,437,978 | B2 * | 9/2016 | Green | H01R 13/652 |
| 9,711,880 | B2 * | 7/2017 | Kiryu | H01R 12/716 |
| 9,985,366 | B2 * | 5/2018 | Takeuchi | H01R 12/707 |
| 2009/0239422 | A1 * | 9/2009 | Fukazawa | H01R 12/716 439/660 |

FOREIGN PATENT DOCUMENTS

| | | | |
|---|---|---|---|
| JP | 2009230945 | A | 10/2009 |
| JP | 2014165066 | A | 9/2014 |

* cited by examiner

BOARD-TO-BOARD CONNECTOR FOR ABSORBING MISALIGNMENT

This application is based on and claims the benefit of priority from Japanese Patent Applications No. 2017-002430, filed on 11 Jan. 2017, the content of which is incorporated herein by reference.

BACKGROUND OF THE INVENTION

Field of the Invention

The present invention relates to a board-to-board connector. In particular, the invention relates to a board-to-board connector which moves a second connector mounted on the other printed circuit board disposed to face one printed circuit board toward a first connector with respect to the first connector mounted on one printed circuit board so that one printed circuit board is electrically connected to the other printed circuit board, the board-to-board connector having a structure in which the first connector has a movable (or floating) connection structure absorbing a misalignment between one printed circuit board and the other printed circuit board.

Related Art

A board-to-board connector can electrically connect one printed circuit board to the other printed circuit board by moving a second connector mounted on the other printed circuit board disposed to face one printed circuit board toward a first connector with respect to the first connector mounted on one printed circuit board so that the first connector is fitted to the second connector.

Incidentally, when there is a misalignment in one printed circuit board having the first connector mounted thereon and/or the other printed circuit board having the second connector mounted thereon in the board-to-board connector, the first connector and the second connector may not properly connected to each other even when the other printed circuit board is moved toward one printed circuit board.

In order to solve such a problem, for example, JP 2009-230944 A (hereinafter, referred to as Patent Literature 1) discloses a board-to-board connector in which a first contact is movably supported with respect to a housing constituting a first connector so that a first connector mounted on one printed circuit board is properly connected to a second connector mounted on the other printed circuit board.

The board-to-board connector according to Patent Literature 1 includes a receptacle mounted on one surface of a first printed circuit board and a plug mounted on one surface of a second printed circuit board. When the second printed circuit board is moved toward the first printed circuit board while the receptacle and the plug are disposed to face each other, the receptacle and the plug can be electrically connected to each other.

The receptacle includes a rectangular parallelepiped first housing, a flat header provided at the center of the concave portion of the first housing, and a pair of first contacts disposed in parallel along an outer wall of the header with the header interposed therebetween. A base end portion of each of the first contacts is provided with a lead portion bonded to one surface of the first printed circuit board by soldering. The lead portion extends from a bottom surface of the concave portion of the first housing and reaches the first contact facing an opening portion of the concave portion through a wave-shaped or S-shaped movable portion floating from the first printed circuit board.

The plug includes a pair of second contacts disposed in parallel along an inner wall of a concave portion of a rectangular parallelepiped second housing. The header of the receptacle can be inserted into the concave portion of the second housing.

A base end portion of each of the second contacts is provided with a lead portion bonded to one surface of the second printed circuit board by soldering. The lead portion extends from a bottom surface of the concave portion of the second housing to an inner wall facing the opening portion of the concave portion and reaches the second contact.

When the contacts of the plug, that is, facing contacts at the front end portions of the pair of second contacts are inserted into the header of the receptacle, the contact of the second contact can contact the front end portion of the first contact. Accordingly, the first printed circuit board and the second printed circuit board are electrically connected to each other through the first contact and the second contact.

In the board-to-board connector according to the related art, it is described that the misalignment between the first printed circuit board and the second printed circuit board can be absorbed since the pair of first contacts movably supports the header through the wave-shaped or S-shaped movable portion of the first contact.

However, the board-to-board connector according to the related art has a problem in which the header cannot be minutely moved in the longitudinal direction of the first housing even when the header can be minutely moved in a direction orthogonal to the longitudinal direction of the first housing. Further, since the first connector includes two parts, that is, the housing and the header, a problem arises in that the number of components increases.

SUMMARY OF THE INVENTION

The invention is made in view of such problems and an object of the invention is to provide a board-to-board connector which electrically connects a first printed circuit board having one connector mounted thereon to a second printed circuit board having the other connector mounted thereon so that one connector is minutely movable in all directions with respect to the first printed circuit board and a configuration is simple.

The inventors have realized a floating contact by a winding portion in such a manner that a band-shaped metal plate is wound to form a winding portion and terminals protruding in the opposite directions in a direction orthogonal to a winding direction are provided at a starting end portion and a terminal end portion of the winding portion. The inventors have found that the above-described problems can be solved by movably supporting one connector with respect to the printed circuit board using such a floating contact and have invented a novel board-to-board connector as below based on this structure.

The first aspect of the present invention is a board-to-board connector for electrically connecting a first printed circuit board having a first connector mounted thereon to a second printed circuit board having a second connector mounted thereon, in which the first connector includes: a rectangular parallelepiped first housing which includes a concave portion having one opened surface and fitted to the second connector and a first contact accommodation chamber having the other opened surface; and one or more floating first contacts of which one end portion is fixed to the first printed circuit board, the other end portion is fixed to the first housing, and an intermediate portion is accommodated in the first contact accommodation chamber and in which the first housing is movably supported with respect to the first printed circuit board, in which the second connector includes: a rectangular parallelepiped second housing which has an insertion hole opened to one surface thereof so that the first contact is insertable into the insertion hole; and a second contact which is accommodated in the second housing and contacts the first contact, and in which the first contact includes: a winding portion which includes a band-shaped metal plate, is wound inward by at least one revolution from a starting end portion to a terminal end portion along a first surface and a second surface at a side in which a distance between facing surfaces of the metal plate is long so that the terminal end portion reaches a center portion, and is formed at the intermediate portion; a lead terminal which forms the one end portion and protrudes in a direction perpendicular to the first surface at the starting end portion of the winding portion; and a contact terminal which forms the other end portion, protrudes in a direction perpendicular to the second surface at the terminal end portion of the winding portion, and is press-inserted into the first housing while protruding from a bottom surface of the concave portion.

The second aspect of the present invention is a board-to-board connector according to the first aspect, in which the first housing further includes a pair of protrusion portions which protrudes from the other surface, in which the first printed circuit board further includes a pair of regulation holes into which the protrusion portions are insertable to have a gap with respect to the protrusion portion inserted thereinto, and in which the gap regulates a horizontal movement amount of the first housing with respect to the first printed circuit board.

The third aspect of the present invention is a board-to-board connector according to the second aspect, in which the protrusion portion may be a boss having an oval cross-section and the regulation hole may have a shape larger than the cross-section of the boss.

The fourth aspect of the present invention is a board-to-board connector according to the second aspect, in which the protrusion portion may include a hook and the regulation hole may have a shape larger than an outer shape of the hook.

The fifth aspect of the present invention is a board-to-board connector according to any one of the first to fourth aspect, in which the winding portion may include one or more portions obtained by bending the metal plate between the starting end portion and the terminal end portion.

The sixth aspect of the present invention is a board-to-board connector according to the fifth aspect, in which the bending of the metal plate at the winding portion may have an angle in the range of 60° to 120°.

The seventh aspect of the present invention is a board-to-board connector according to any one of the first to sixth aspect, in which the winding portion may include one or more portions obtained by curving the metal plate between the starting end portion and the terminal end portion.

The eighth aspect of the present invention is a board-to-board connector according to any one of the first to seventh aspect, in which the winding portion may be formed such that the metal plate is flipped outward from the starting end portion and is wound inward to reach the terminal end portion.

The ninth aspect of the present invention is a board-to-board connector for electrically connecting a first printed circuit board having a first connector mounted thereon to a second printed circuit board having a second connector mounted thereon, in which the first connector includes: a rectangular parallelepiped first housing which includes a concave portion having one opened surface and fitted to the second connector and a first contact accommodation chamber having the other opened surface; and one or more floating first contacts of which one end portion is fixed to the first printed circuit board, the other end portion is fixed to the first housing, and an intermediate portion is accommodated in the first contact accommodation chamber and in which the first housing is movably supported with respect to the first printed circuit board, in which the second connector includes: a rectangular parallelepiped second housing which has an insertion hole opened to one surface thereof so that the first contact is insertable into the insertion hole; and a second contact which is accommodated in the second housing and contacts the first contact, in which the first contact is formed such that the intermediate portion includes a winding portion obtained by winding a band-shaped metal plate, and in which the first housing includes a pair of hooks which protrudes from the other surface and the first printed circuit board includes a regulation hole locked to the hook and formed to be larger than an outer shape of the hook.

BRIEF DESCRIPTION OF THE DRAWINGS

FIG. 4A is a top view, FIG. 4B is a left view, and FIG. 4C is a front view.

FIG. 9A is a top view, FIG. 9B is a front view, FIG. 9C is a right view, FIG. 9D is a rear view, and FIG. 9E is a bottom view.

FIG. 10A is a top view, FIG. 10B is a front view, FIG. 10C is a right view, FIG. 10D is a left view, FIG. 10E is a rear view, and FIG. 10F is a bottom view.

FIG. 11A is a left view and FIG. 11B is a front view.

FIG. 12A illustrates a state before the first connector and the second connector are fitted to each other and FIG. 12B illustrates a state where the first connector and the second connector are fitted to each other.

FIG. 13A illustrates a first modified example, FIG. 13B illustrates a second modified example, and FIG. 13C illustrates a third modified example.

FIG. 16A is a top view, FIG. 16B is a front view, FIG. 16C is a right view, FIG. 16D is a rear view, and FIG. 16E is a bottom view.

DETAILED DESCRIPTION OF THE INVENTION

Hereinafter, embodiments of the invention will be described with reference to the drawings.

First Embodiment

Configuration of Board-to-Board Connector

First, a configuration of a board-to-board connector according to a first embodiment of the invention will be described.

Figure 1:
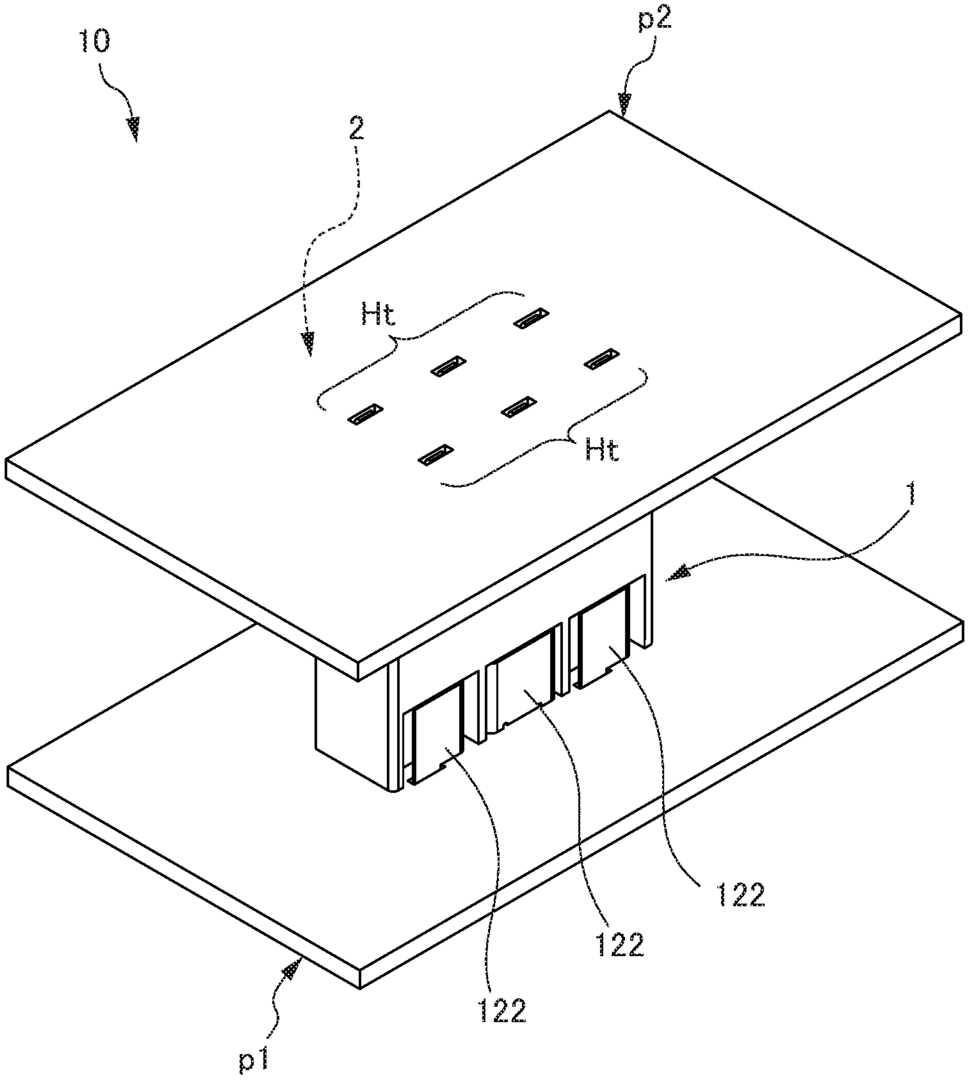
FIG. 1 is a perspective view illustrating a configuration of a board-to-board connector according to a first embodiment of the invention and illustrating a state where a first printed circuit board and a second printed circuit board are disposed to face each other.

FIG. 1 is a perspective view illustrating a configuration of the board-to-board connector according to the first embodiment of the invention and illustrating a state where a first printed circuit board and a second printed circuit board are disposed to face each other.

Figure 2:
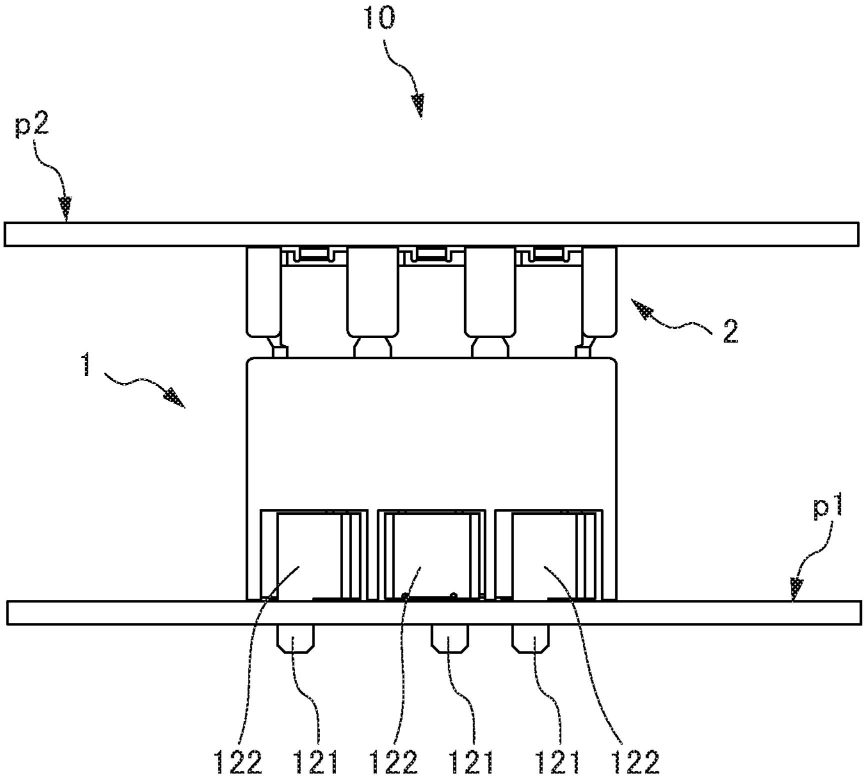
FIG. 2 is a front view illustrating a configuration of the board-to-board connector according to the first embodiment and illustrating a state where a first connector and a second connector are fitted to each other.

FIG. 2 is a front view illustrating a configuration of FIG. 1 and illustrating a state where a first connector and a second connector are fitted to each other.

Figure 3:
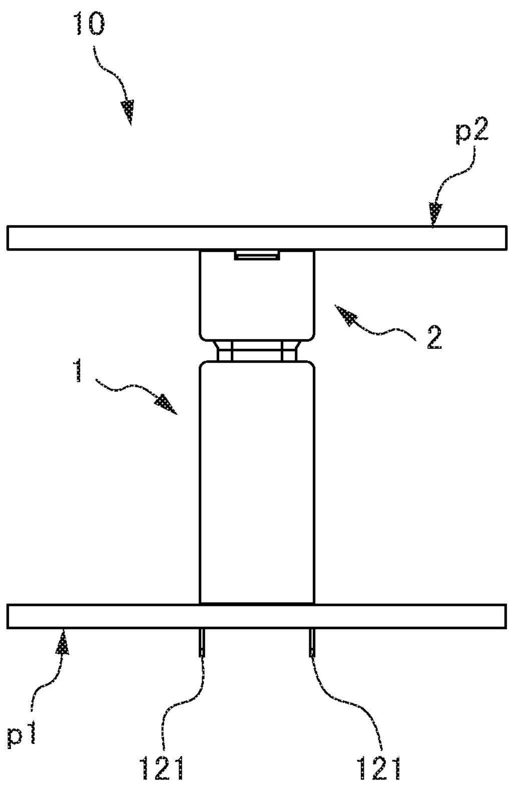
FIG. 3 is a right view illustrating a configuration of the board-to-board connector according to the first embodiment and illustrating a state where the first connector and the second connector are fitted to each other.
Figure 4A:
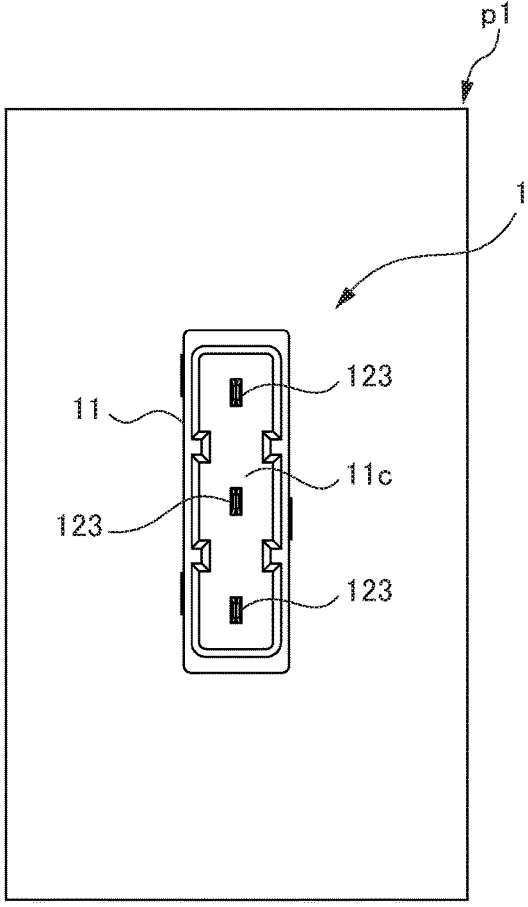
FIGS. 4A to 4C are diagrams illustrating the first connector mounted on a first printed circuit board and constituting the board-to-board connector according to the first embodiment, where
Figure 4C:
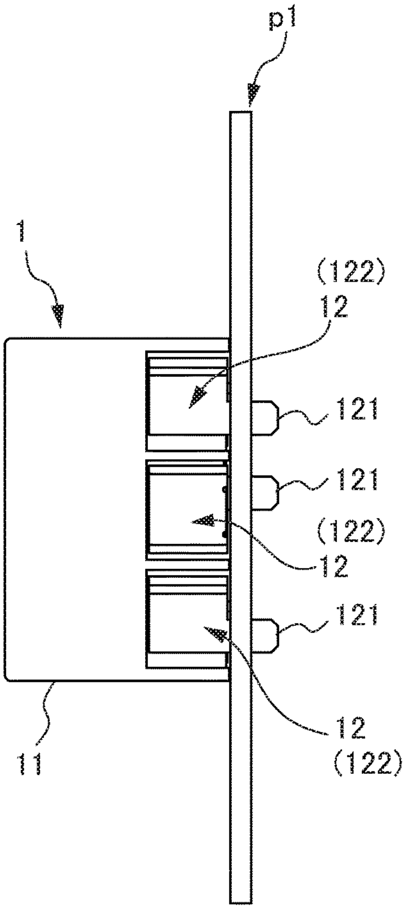
Figure 4B:
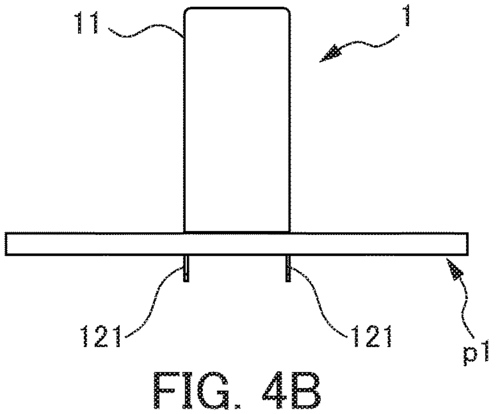

FIG. 3 is a right view of a configuration of FIG. 2. FIGS. 4A to 4C are diagrams illustrating the first connector mounted on the first printed circuit board and constituting the board-to-board connector according to the first embodiment, where FIG. 4A is a top view, FIG. 4B is a left view, and FIG. 4C is a front view.

Figure 5:
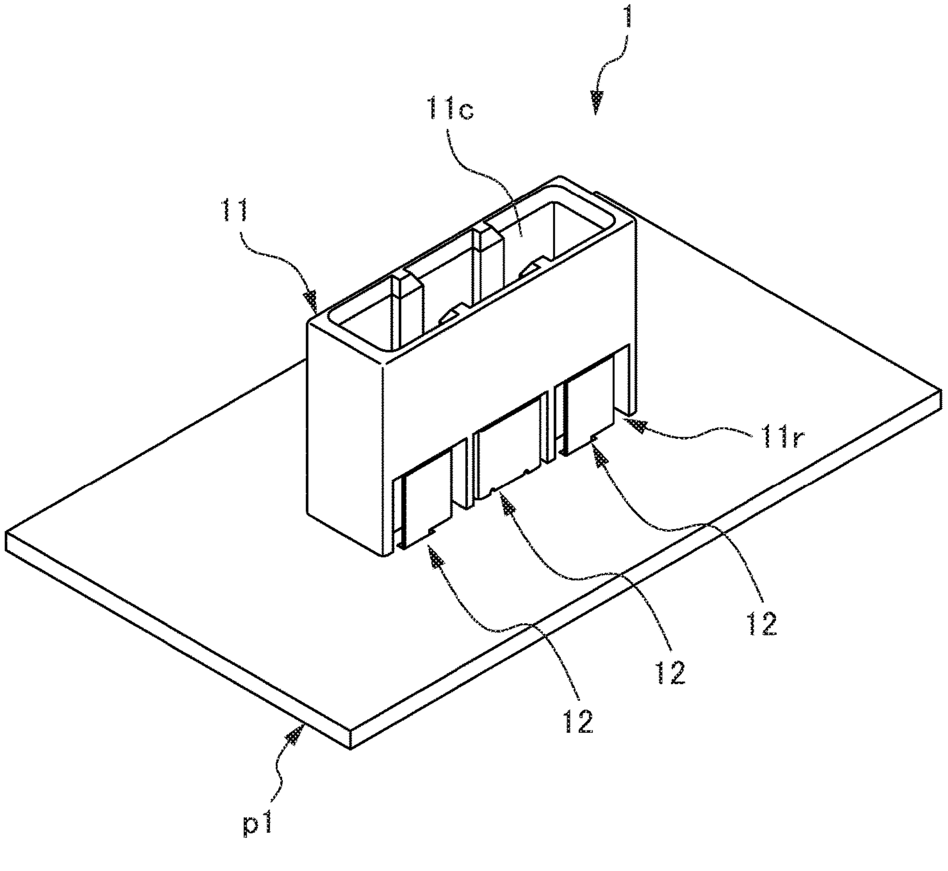
FIG. 5 is a perspective view of the first connector constituting the board-to-board connector according to the first embodiment illustrating a state where the first connector is mounted on the first printed circuit board.

Further, FIG. 5 is a perspective view illustrating a configuration of FIGS. 4A to 4C.

Figure 6:
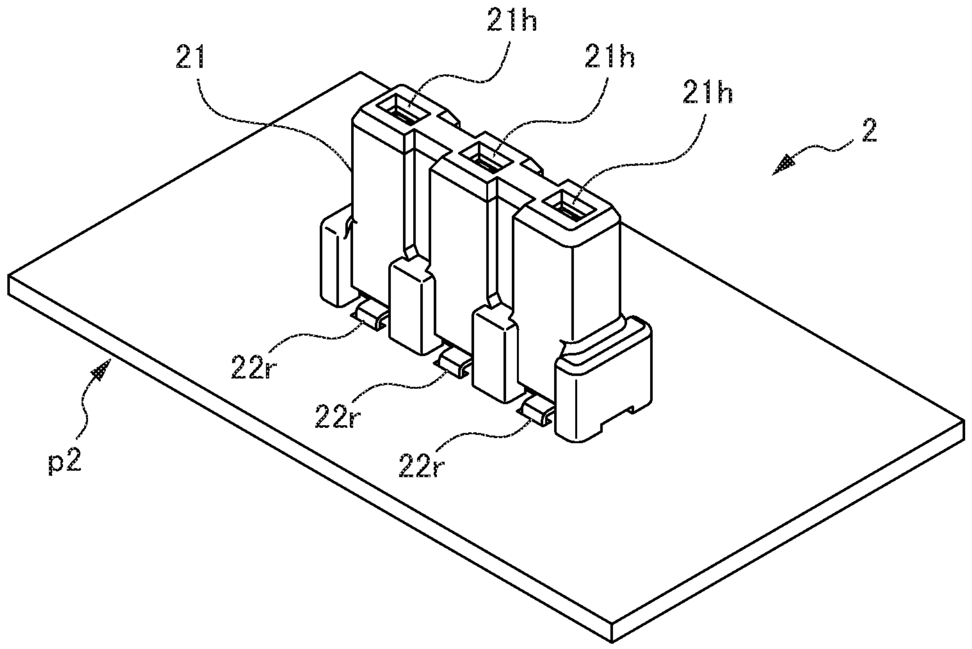
FIG. 6 is a perspective view of the second connector constituting the board-to-board connector according to the first embodiment illustrating a state where the second connector is mounted on the second printed circuit board.

FIG. 6 is a perspective view of the second connector constituting the board-to-board connector according to the first embodiment and mounted on the second printed circuit board.

Figure 7:
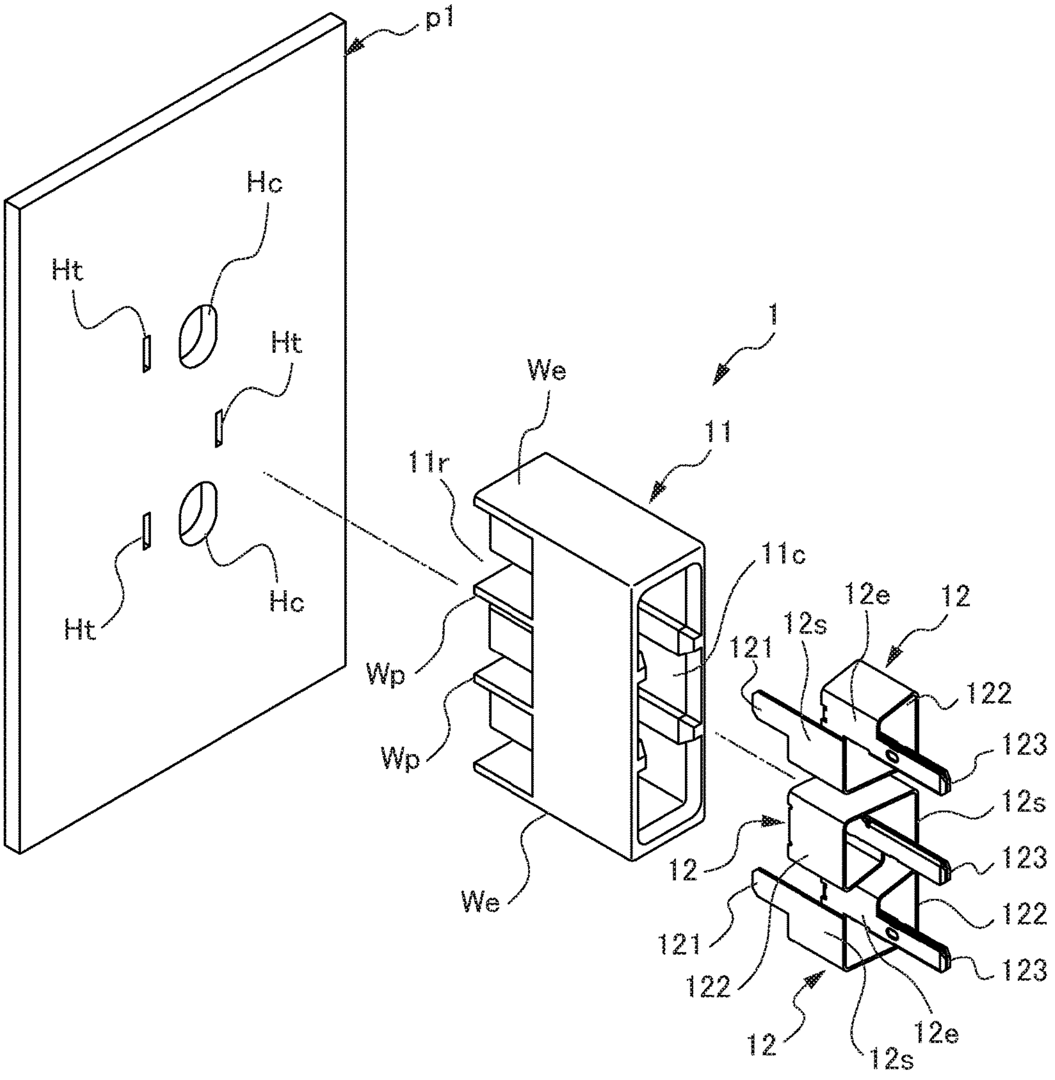
FIG. 7 is a perspective exploded view of the first connector constituting the board-to-board connector according to the first embodiment.

FIG. 7 is a perspective exploded view of the first connector constituting the board-to-board connector according to the first embodiment.

Figure 8:
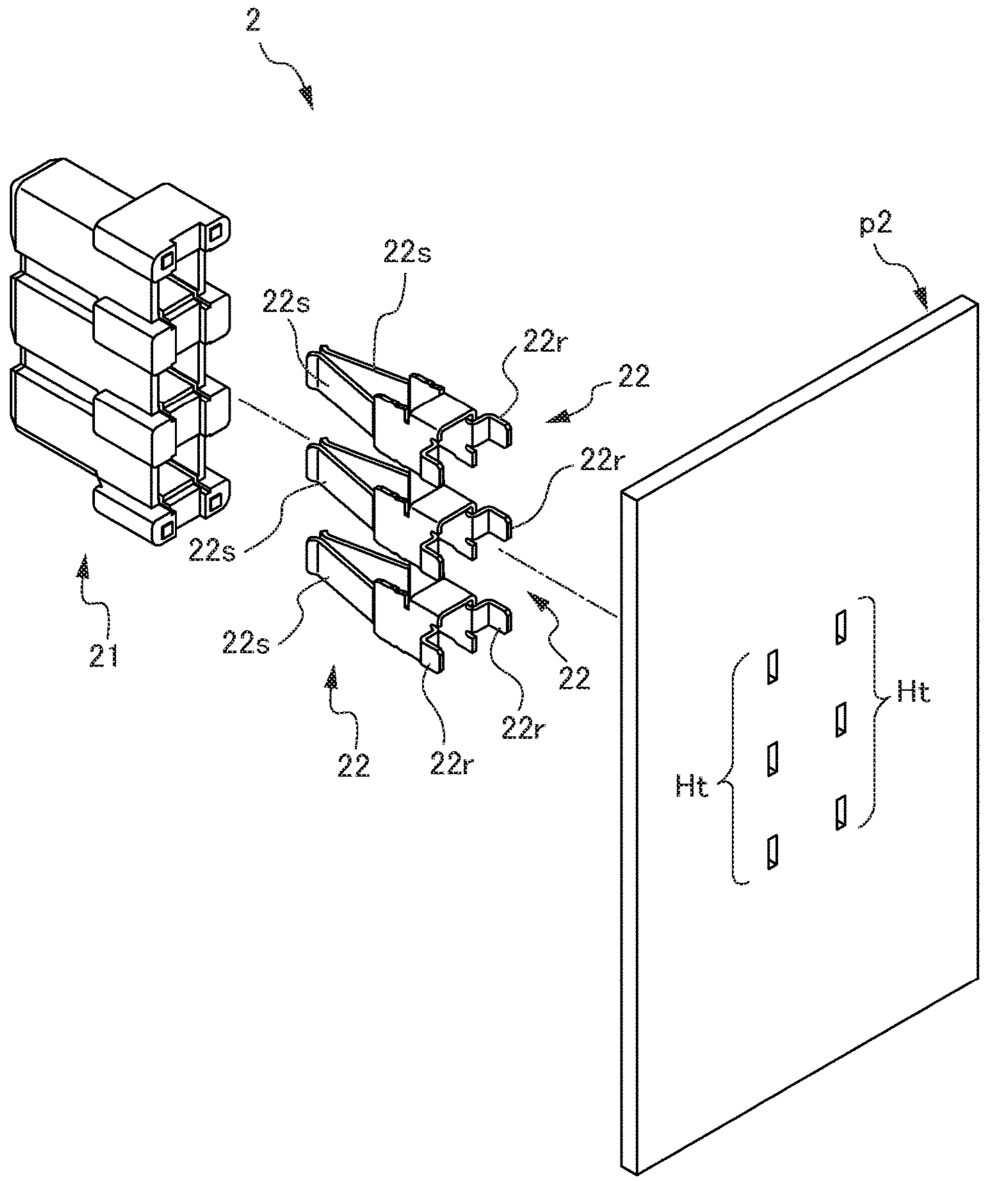
FIG. 8 is a perspective exploded view of the second connector constituting the board-to-board connector according to the first embodiment.

FIG. 8 is a perspective exploded view of the second connector constituting the board-to-board connector according to the first embodiment.

Figure 9D:
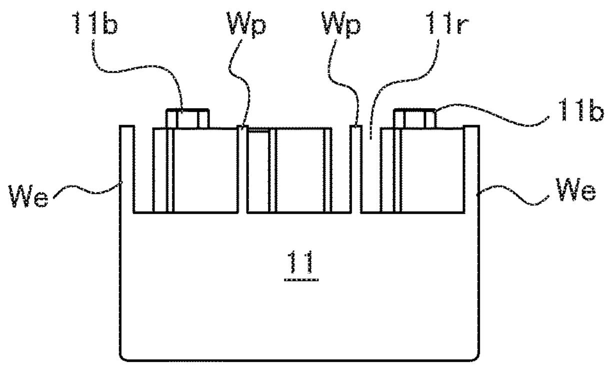
FIGS. 9A to 9E are diagrams illustrating a configuration of a first housing provided in the first connector constituting the board-to-board connector according to the first embodiment, where
Figure 9A:
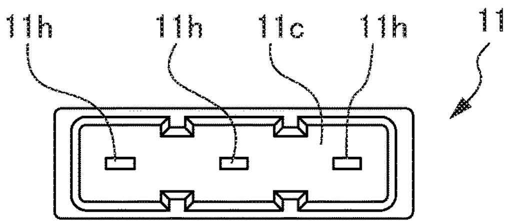
Figure 9C:
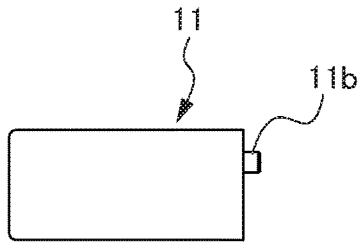
Figure 9B:
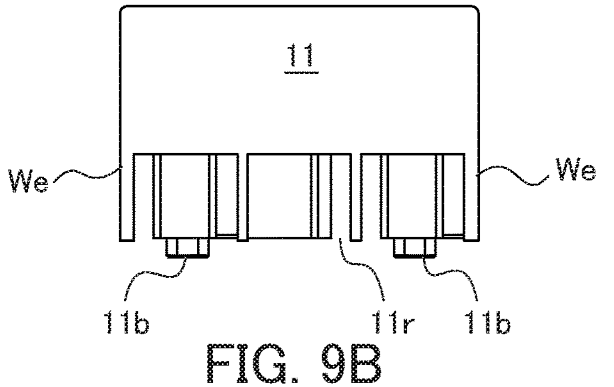
Figure 9E:
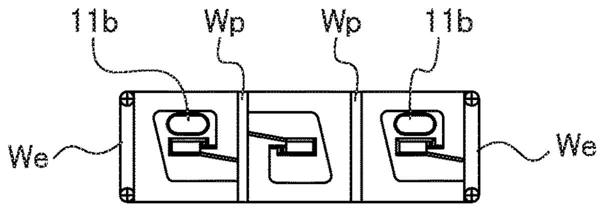

FIGS. 9A to 9E are diagrams illustrating a configuration of a first housing provided in the first connector constituting the board-to-board connector according to the first embodiment, where FIG. 9A is a top view, FIG. 9B is a front view, FIG. 9C is a right view, FIG. 9D is a rear view, and FIG. 9E is a bottom view.

Figure 10E:
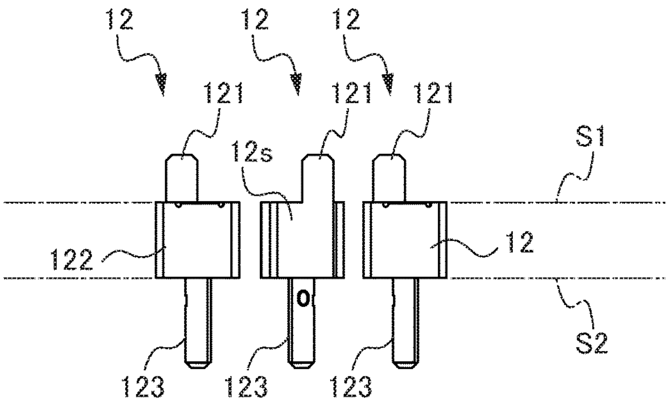
FIGS. 10A to 10F are diagrams illustrating a configuration of a first contact provided in the first connector constituting the board-to-board connector according to the first embodiment, where
Figure 10D:
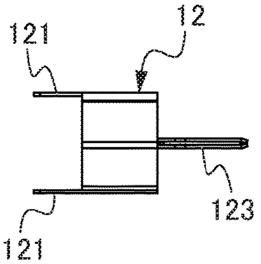
Figure 10A:
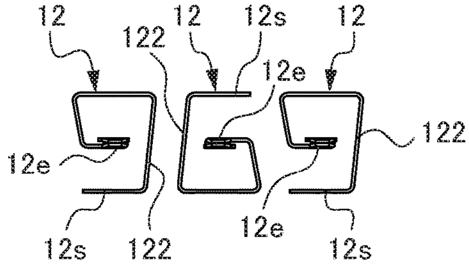
Figure 10C:
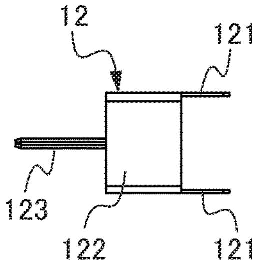
Figure 10B:
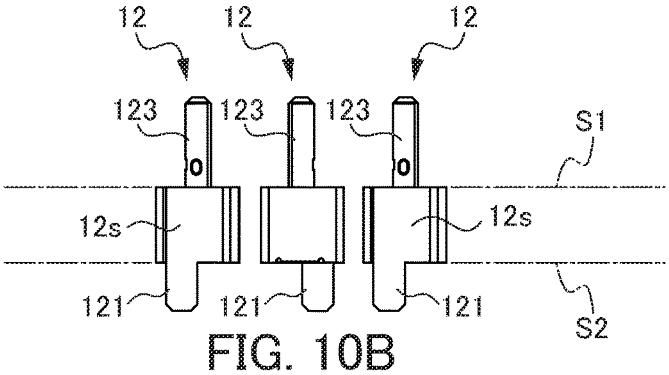
Figure 10F:
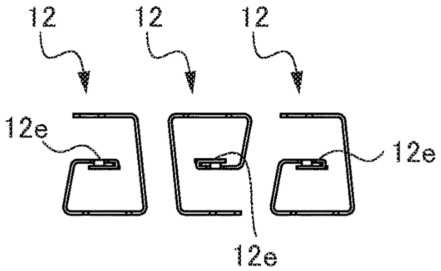

FIGS. 10A to 10F are diagrams illustrating a configuration of a first contact provided in the first connector constituting the board-to-board connector according to the first embodiment, where FIG. 10A is a top view, FIG. 10B is a front view, FIG. 10C is a right view, FIG. 10D is a left view, FIG. 10E is a rear view, and FIG. 10F is a bottom view.

Figure 11A:
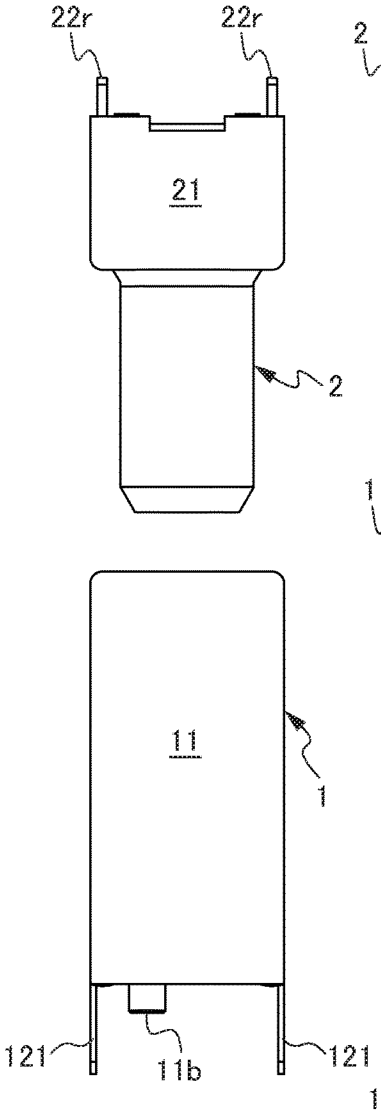
FIGS. 11A and 11B are diagrams illustrating a state where the first connector and the second connector constituting the board-to-board connector according to the first embodiment are disposed to face each other, where
Figure 11B:
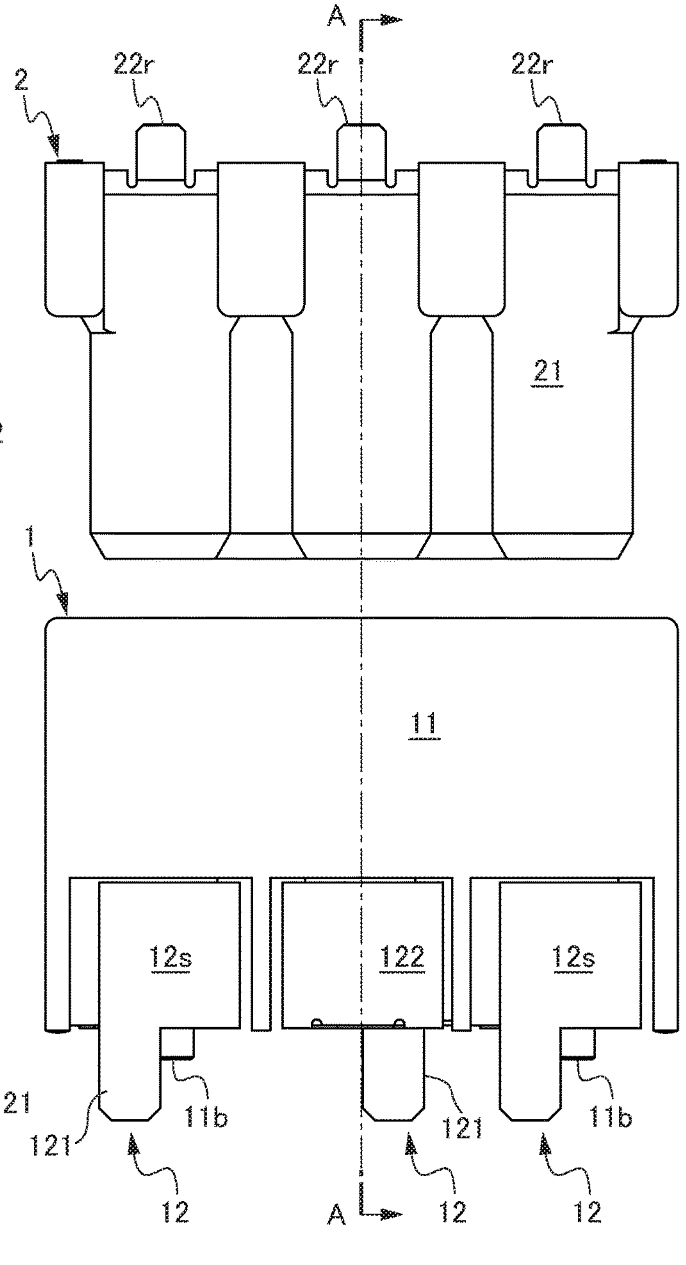

FIGS. 11A and 11B are diagrams illustrating a state where the first connector and the second connector constituting the board-to-board connector according to the first embodiment are disposed to face each other, where FIG. 11A is a left view and FIG. 11B is a front view.

Figure 12A:
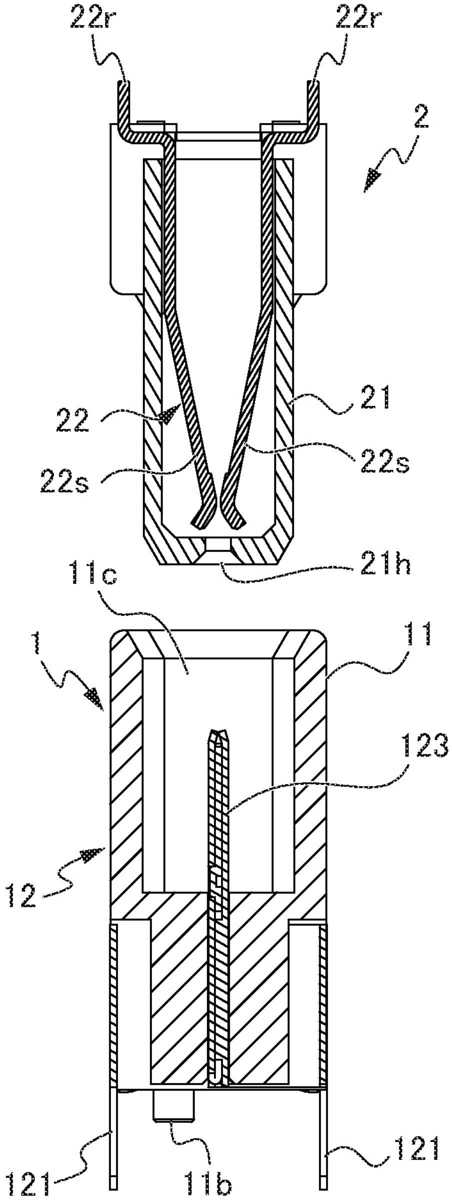
FIGS. 12A and 12B are longitudinal sectional views illustrating the first connector and the second connector constituting the board-to-board connector according to the first embodiment, where
Figure 12B:
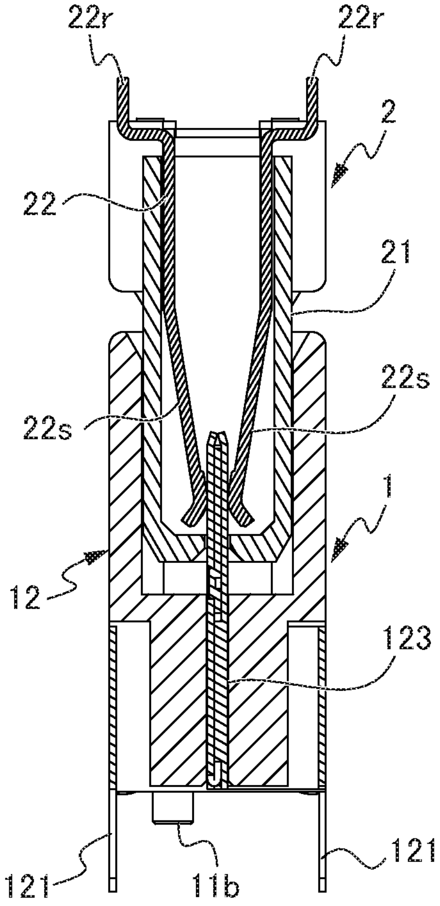

FIGS. 12A and 12B are longitudinal sectional views of the first connector and the second connector constituting the board-to-board connector according to the first embodiment, where FIG. 12A illustrates a state before the first connector and the second connector are fitted to each other and FIG. 12B illustrates a state where the first connector and the second connector are fitted to each other.

Entire Configuration

Referring to FIG. 1 to FIGS. 12A and 12B, a board-to-board connector 10 according to the first embodiment of the invention can electrically connect a first printed circuit board p1 having a first connector (hereinafter, referred to as a receptacle) 1 mounted thereon to a second printed circuit board p2 having a second connector (hereinafter, referred to as a plug) 2 mounted thereon.

The receptacle 1 includes a rectangular parallelepiped first housing 11 and three floating first contacts 12. The plug 2 includes a rectangular parallelepiped second housing 21 and three second contacts 22.

Referring to FIG. 5 or FIG. 7 and FIGS. 9A to 9E, the first housing 11 includes a concave portion 11*c* and a first contact accommodation chamber 11*r*. The concave portion 11*c* is opened to one surface of the first housing 11 to have a rectangular shape and can be fitted to the plug 2 (see FIGS. 12A and 12B).

The first contact accommodation chamber 11*r* is opened to the other surface of the first housing 11 and can accommodate a winding portion 122 formed at an intermediate portion of the first contact 12. Specifically, the first contact accommodation chamber 11*r* is defined into three parts by a pair of outer walls We and We and a pair of partition walls Wp and Wp.

One end portion of the first contact 12 is fixed to the first printed circuit board p1. Further, the other end portion of the first contact 12 is fixed to the first housing 11. Further, an intermediate portion of the first contact 12 is accommodated in the first contact accommodation chamber 11*r* and the first housing 11 is movably supported with respect to the first printed circuit board p1.

Referring to FIG. 6 or FIG. 12A, three insertion holes 21*h* are opened to one surface in the second housing 21. The first contact 12 can be inserted into the insertion hole 21*h*. More specifically, a contact terminal 123 of the first contact 12 can be inserted into the insertion hole 21*h* (see FIG. 12B).

Referring to FIGS. 12A and 12B, the second contact 22 is accommodated inside the second housing 21. A front end portion side of the second contact 22 is provided with a pair of contact pieces 22*s* and 22*s* disposed to face each other. Front end portions of the pair of contact pieces 22*s* and 22*s* are disposed to face the insertion hole 21*h*. Accordingly, when the contact terminal 123 of the first contact 12 enters the second housing 21 through the insertion hole 21*h*, the second contact 22 can contact the first contact 12.

Referring to FIG. 7 or FIGS. 10A to 10F, a winding portion 122 is formed at an intermediate portion of the first contact 12. The winding portion 122 includes a band-shaped metal plate and is wound inward by at least one revolution from a starting end portion to a terminal end portion of the metal plate along a first surface S1 and a second surface S2 at a side in which a distance between facing surfaces of the metal plate is long and the terminal end portion reaches a center portion of the winding. The center portion of the winding is a center portion of the winding portion 122 and may be located at a center portion of the first housing 11.

One end portion of the first contact 12 is provided with a lead terminal 121 connected to the first printed circuit board p1. The lead terminal 121 protrudes in a direction perpendicular to the first surface S1 at a starting end portion 12*s* of the winding portion 122.

The other end portion of the first contact 12 is provided with the contact terminal 123. The contact terminal 123 protrudes in a direction perpendicular to the second surface S2 in a terminal end portion 12*e* of the winding portion 122, that is, a direction opposite to the lead terminal 121. Then, the contact terminal 123 is press-inserted into the first housing 11 while protruding from a bottom surface of the concave portion 11*c* (see FIGS. 12A and 12B).

In the board-to-board connector 10 according to the first embodiment, the band-shaped metal plate is wound to form the winding portion 122 and terminals of the lead terminal 121 and the contact terminal 123 protruding in the opposite direction in the axial direction of the winding (a direction orthogonal to the winding direction) are provided at the starting end portion 12*s* and the terminal end portion 12*e* of the winding portion 122, thereby realizing the floating first contact 12 by the winding portion 122. Accordingly, it is possible to provide the board-to-board connector in which the receptacle 1 can minutely move in all directions with respect to the first printed circuit board p1 and the configuration is simple.

Configuration of First Housing

Next, a configuration of the first housing 11 according to the first embodiment will be described. Referring to FIG. 7 or FIGS. 9A to 9E and FIGS. 11A and 11B, the first housing 11 is desirably formed of an insulator and can be formed into a predetermined rectangular parallelepiped structure by molding a synthetic resin having an insulation property. The first housing 11 further includes a pair of bosses 11*b* and 11*b*protruding in an oval shape from the other surface, that is, a bottom surface of the first housing 11. These bosses 11*b* and 11*b* are examples of a pair of protrusion portions protruding from the other surface of the first housing.

Meanwhile, a pair of regulation holes Hc and Hc into which the pair of bosses 11*b* and 11*b* is insertable is opened to the first printed circuit board p1. The regulation hole Hc has a gap with respect to the boss 11*b* inserted thereinto. Here, the regulation hole Hc is formed in an oval shape to be slightly larger than an outer shape of the boss 11*b*.

Referring to FIGS. 1 to 3, a movement amount of the first housing 11 in the horizontal direction with respect to the first printed circuit board p1 is regulated by a gap between the boss 11*b* and the regulation hole Hc in a state where the bottom surface of the first housing 11 contacts or is close to one surface of the first printed circuit board p1.

Configuration of First Contact

Next, a configuration of the first contact 12 according to the first embodiment will be described. Referring to FIG. 7 or FIGS. 10A to 10F, the first contact 12 is desirably formed by a conductive metal plate and can be formed into a predetermined structure having the winding portion 122 formed at an intermediate portion by molding a conductive development plate.

The lead terminal 121 of the first contact 12 is inserted into a through-hole Ht provided in the first printed circuit board p1 and the lead terminal 121 is bonded to the through-hole Ht by soldering, so that the first contact 12 can be fixed to the first printed circuit board p1.

Referring to FIG. 7 or 9A, the contact terminal 123 of the first contact 12 is press-inserted into a press-insertion hole 11*h* opened to the bottom surface of the concave portion 11*c* from the other surface side of the first housing 11 (the side of the first contact accommodation chamber 11*r*). Accordingly, the first contact 12 can be fixed to the first housing 11 while the contact terminal 123 protrudes from the bottom surface of the concave portion 11*c* (see FIG. 12A).

Referring to FIG. 7 or FIGS. 12A and 12B, in the first contact 12, the lead terminal 121 is fixed to the first printed circuit board p1, the contact terminal 123 is fixed to the first housing 11, and the lead terminal 121 and the contact terminal 123 are connected to each other by the winding portion 122. Accordingly, the first contact 12 can movably support the first housing 11 with respect to the first printed circuit board p1.

Referring to FIG. 7 or FIGS. 10A to 10F, for example, the winding portion 122 of the first contact 12 is formed while being bent four times at a substantially right angle, desirably a predetermined angle in the range of 60° to 120°, a predetermined angle in the range of 70° to 110°, or a predetermined angle in the range of 80° to 100° along the first surface S1 and the second surface S2 at a side in which a distance between facing surfaces of the metal plate is long from the starting end portion 12*s* to the terminal end portion 12*e* of the band-shaped metal plate. The winding portion of the first contact 12 is not limited to the first embodiment and a plurality of modified examples can be suggested.

Configuration of Modified Example of First Contact

Figure 13C:
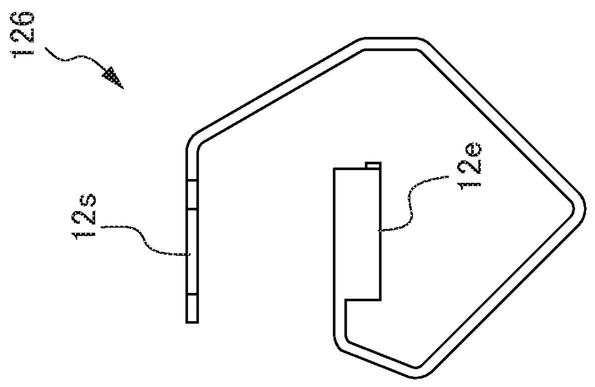
FIGS. 13A to 13C are top views illustrating modified examples of the first contact, where
Figure 13B:
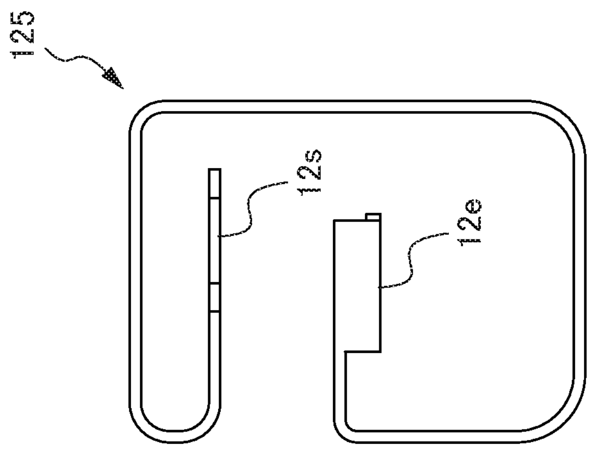
Figure 13A:
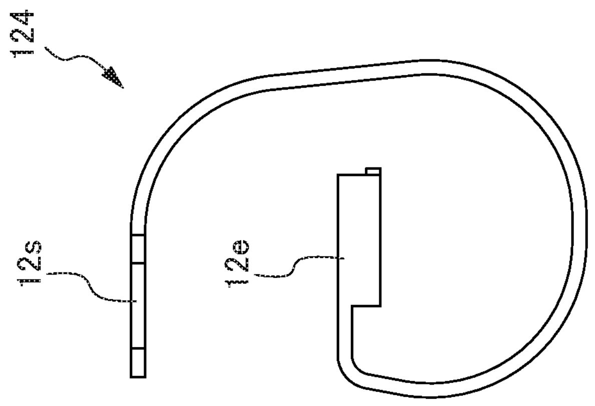

Next, configurations of modified examples of the first contact 12 according to the first embodiment will be described. FIGS. 13A to 13C are top views illustrating the modified examples of the first contact, FIG. 13A illustrates a first modified example, FIG. 13B illustrates a second modified example, and FIG. 13C illustrates a third modified example.

Referring to FIG. 13A, a winding portion 124 according to the first modified example includes a curved portion along a first surface and a second surface at a side in which a distance between facing surfaces of a metal plate is long from the starting end portion 12*s* to the terminal end portion 12*e* of the band-shaped metal plate.

Referring to FIG. 13B, a winding portion 125 according to the second modified example is flipped outward from the starting end portion 12*s* and is wound inward along a first surface and a second surface at a side in which a distance between facing surfaces of the band-shaped metal plate is long. In this case, the winding portion 125 includes a curved portion, but may include a bent portion.

Referring to FIG. 13C, a winding portion 126 according to the third modified example is formed to have one or more bent portions along a first surface and a second surface at a side in which a distance between facing surfaces of a metal plate is long from the starting end portion 12*s* to the terminal end portion 12*e* of the band-shaped metal plate. In this case, the winding portion 126 includes a plurality of bent portions, but may include a curved portion.

In this way, the winding portion of the first contact 12 can have a plurality of kinds of modified examples. Further, as illustrated in FIGS. 10A to 10F, three floating first contacts 12 disposed in the first housing 11 of the receptacle 1 may be winding portions formed to have the same pattern so that the first contacts adjacent to each other are disposed in the opposite direction. In such a structure, the positions of the lead terminals 121 connected to the printed circuit board p1 are not arranged on a straight line. For this reason, the movable support of the first housing 11 to the printed circuit board p1 is more stable.

Configuration of Second Housing

Next, a configuration of the second housing 21 according to the first embodiment will be described. Referring to FIG. 6 or FIG. 8 and FIGS. 12A and 12B, the second housing 21 is desirably formed of an insulator and can be formed into a predetermined rectangular parallelepiped structure having a cavity therein by molding a synthetic resin having an insulation property.

The second contact 22 which is press-inserted from the bottom side of the second housing 21 is provided inside the second housing 21. Then, the front end portions of the pair of contact pieces 22*s* and 22*s* are disposed to face an insertion hole 21*h* (see FIGS. 12A and 12B).

Configuration of Second Contact

Next, a configuration of the second contact 22 according to the first embodiment will be described. Referring to FIG. 8 or FIGS. 12A and 12B, the second contact 22 is desirably formed of a metal plate having a conductive property and can be formed into a predetermined turning fork structure by molding a conductive development plate. It is desirable to form the second contact 22 by a copper alloy plate, but the invention is not limited to the copper alloy plate.

The second contact 22 includes a pair of lead portions 22*r* and 22*r* formed at a base end portion thereof. The lead portion 22*r* is inserted into the through-hole Ht provided in the second printed circuit board p2 and the lead portion 22*r* is bonded to the through-hole Ht by soldering, so that the second contact 22 can be fixed to the second printed circuit board p2.

Operation of Board-to-board Connector

Next, the operation and effect of the board-to-board connector 10 according to the first embodiment will be described. Referring to FIG. 1 to FIGS. 12A and 12B, the board-to-board connector 10 according to the first embodiment uses the floating first contact 12 having the winding portion of the band-shaped metal plate. That is, the first contact 12 includes the winding portion 122 which is wound inward by at least one revolution from the starting end portion 12*s* to the terminal end portion 12*e* of the metal plate along the first surface S1 and the second surface S2 at a side in which a distance between facing surfaces of the band-shaped metal plate is long so that the terminal end portion 12*e* reaches the center portion, the lead terminal 121 which is provided at the starting end portion 12*s* and protrudes in a direction perpendicular to the first surface S1, and the contact terminal 123 which is provided at the terminal end portion 12*e* and protrudes in a direction perpendicular to the second surface S2, that is, a direction opposite to the lead terminal 121. Since the lead terminal 121 is fixed to the first printed circuit board p1, the contact terminal 123 is fixed to the first housing 11, and the receptacle 1 is movably supported with respect to the first printed circuit board p1, it is possible to provide the board-to-board connector in which the receptacle 1 can minutely move in all directions with respect to the first printed circuit board and the configuration is simple.

Furthermore, the first housing 11 includes the pair of bosses 11*b* and 11*b* protruding in an oval shape from the other surface, that is, a bottom surface of the first housing 11. Further, the first printed circuit board p1 includes the pair of regulation holes Hc and Hc formed in an oval shape so that the bosses 11*b* and 11*b* are respectively insertable thereinto to have a gap with respect to the boss. Accordingly, when each boss 11*b* is introduced into each regulation hole Hc, the movement amount of the first housing 11 in the horizontal direction with respect to the first printed circuit board p1 can be regulated, and an allowable positioning range can be obtained.

Second Embodiment

Configuration of Board-to-Board Connector

Next, a configuration of a board-to-board connector according to a second embodiment of the invention will be described.

Figure 14:
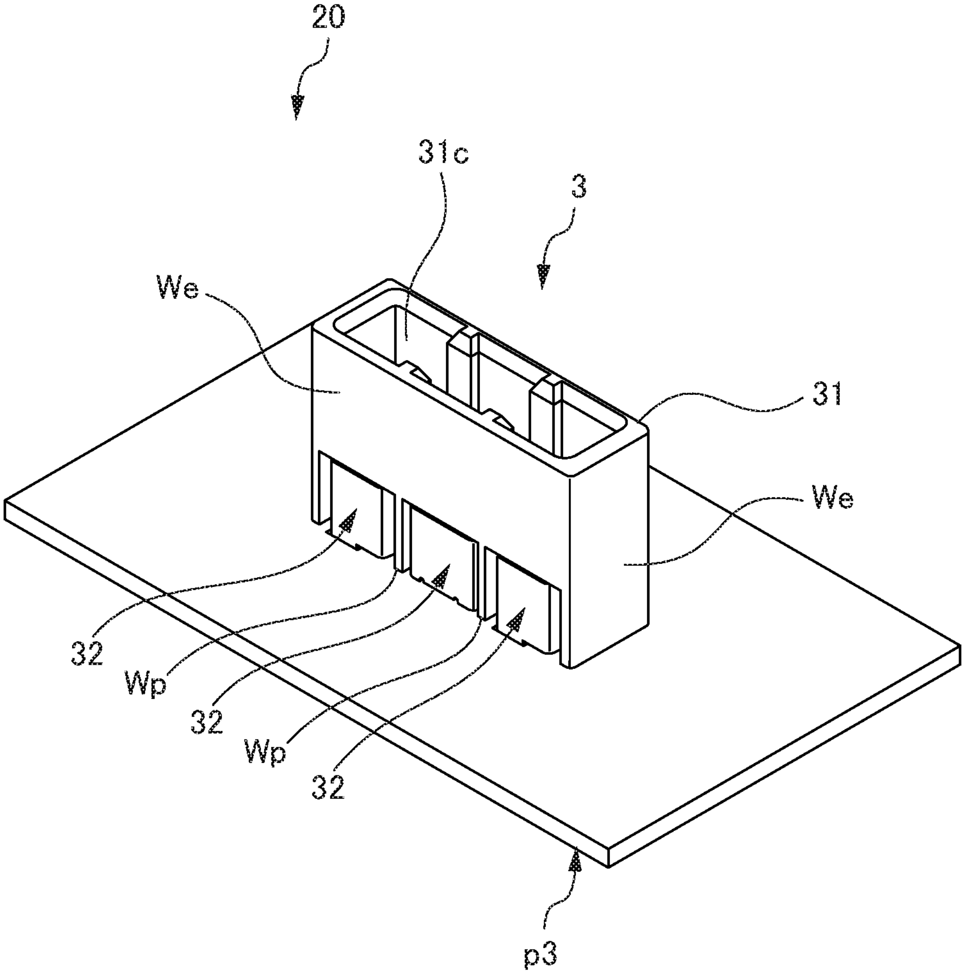
FIG. 14 is a perspective view illustrating a configuration of a first connector constituting a board-to-board connector according to a second embodiment of the invention and illustrating a state where the first connector is mounted on a first printed circuit board.

FIG. 14 is a perspective view illustrating a configuration of a first connector constituting the board-to-board connector according to the second embodiment of the invention in a state where the board-to-board connector is mounted on a first printed circuit board.

Figure 15:
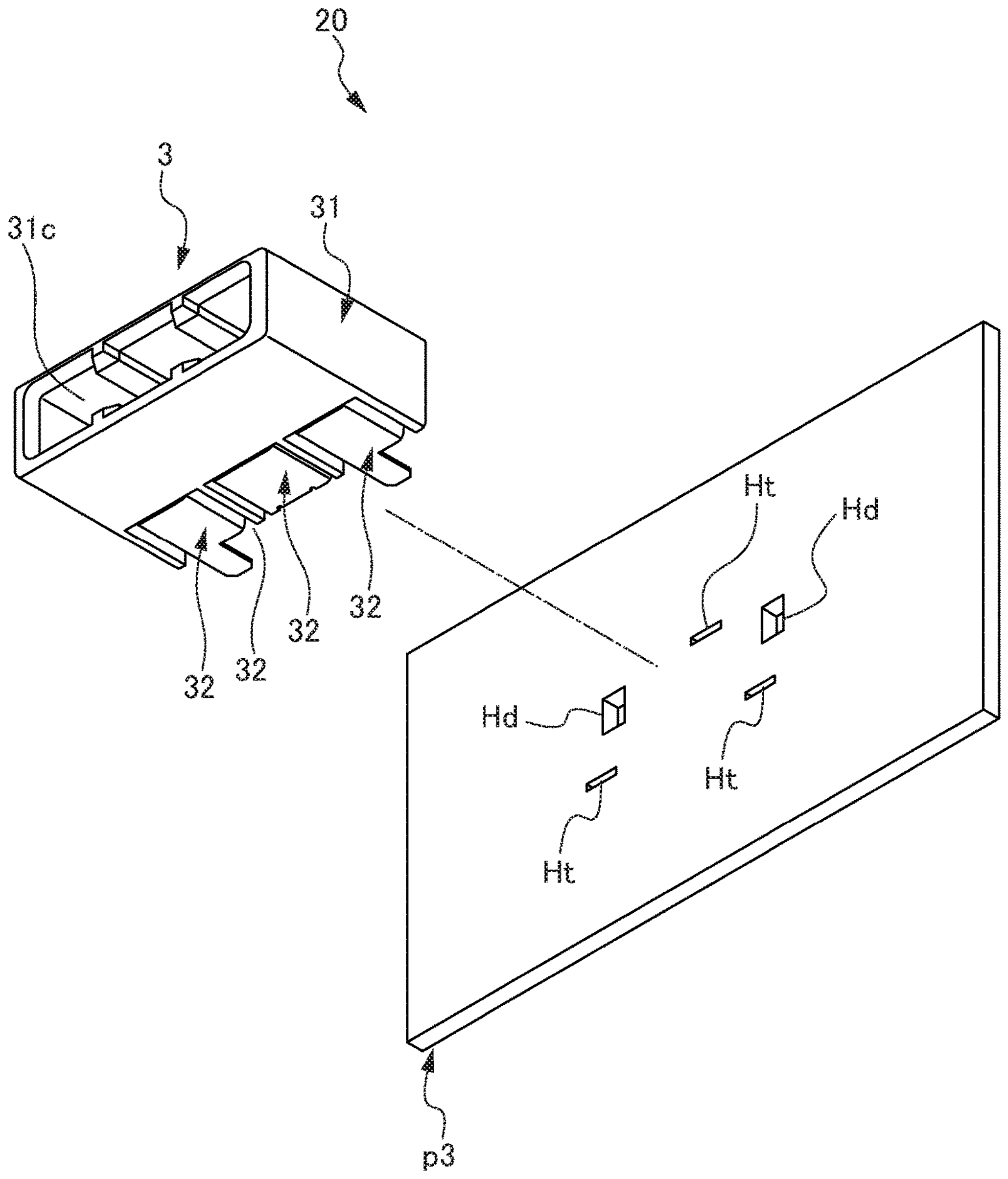
FIG. 15 is a perspective view illustrating a configuration of the first connector constituting the board-to-board connector according to the second embodiment and illustrating a state before the first connector is mounted on the first printed circuit board.

FIG. 15 is a perspective view illustrating a configuration of the first connector constituting the board-to-board connector according to the second embodiment in a state before the board-to-board connector is mounted on the first printed circuit board.

Figure 16D:
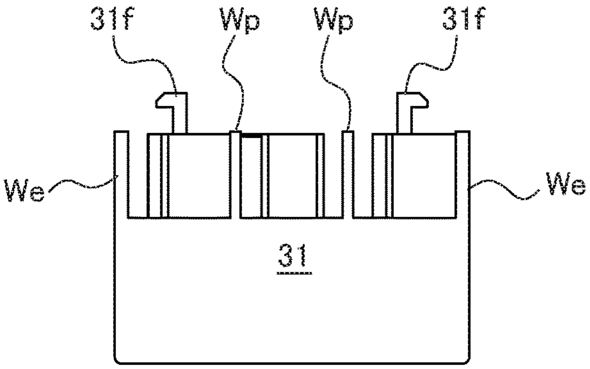
FIGS. 16A to 16E are diagrams illustrating a configuration of a first housing provided in a first connector constituting the board-to-board connector according to the second embodiment, where
Figure 16A:
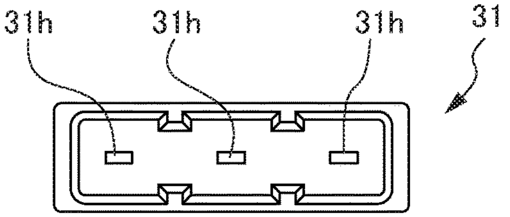
Figure 16C:
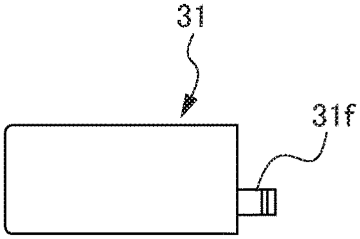
Figure 16B:
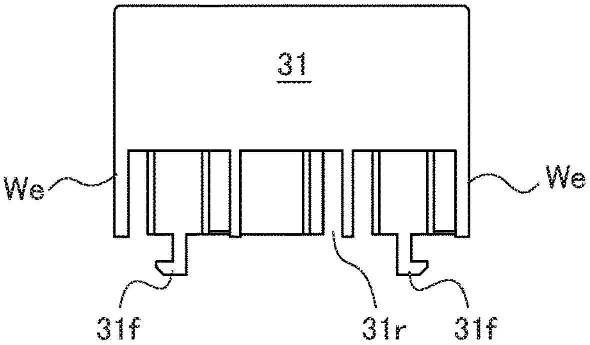
Figure 16E:
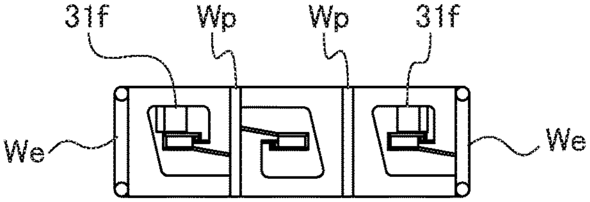

FIGS. 16A to 16E are diagrams illustrating a configuration of a first housing provided in the first connector constituting the board-to-board connector according to the second embodiment, where FIG. 16A is a top view, FIG. 16B is a front view, FIG. 16C is a right view, FIG. 16D is a rear view, and FIG. 16E is a bottom view.

Additionally, since the components indicated by the same reference numerals as those of the first embodiment have the same function, a description thereof may be omitted in the following description.

Entire Configuration

Referring to FIG. 1 to FIG. 3 and FIG. 14 to FIGS. 16A to 16E, a board-to-board connector 20 according to the second embodiment of the invention can electrically connect a first printed circuit board p3 having a first connector (hereinafter, referred to as a receptacle) 3 mounted thereon to a second printed circuit board p2 having a second connector (hereinafter, referred to as a plug) 2 mounted thereon.

The receptacle 3 includes a rectangular parallelepiped first housing 31 and three floating first contacts 32. The plug 2 includes a rectangular parallelepiped second housing 21 and three second contacts 22.

The first housing 31 includes a concave portion 31*c* and a first contact accommodation chamber 31*r*. The concave portion 31*c* is opened to one surface of the first housing 31 to have a rectangular shape and can be fitted to the plug 2.

The first contact accommodation chamber 31*r* is opened to the other surface of the first housing 31 and can accommodate a winding portion (not illustrated) formed as an intermediate portion of the first contact 32. Specifically, the first contact accommodation chamber 31*r* is defined into three parts by a pair of outer walls We and We and a pair of partition walls Wp and Wp.

One end portion of the first contact 32 is fixed to the first printed circuit board p3. Further, the other end portion of the first contact 32 is fixed to the first housing 31. Furthermore, the winding portion of the intermediate portion of the first contact 32 is accommodated in the first contact accommodation chamber 31*r* and the first housing 31 is movably supported with respect to the first printed circuit board p3.

The first contact 32 is the same as the first contact 12, but the reference numerals thereof are changed for convenience of description. That is, similarly to the first embodiment, the first contact 32 includes a winding portion which includes a band-shaped metal plate and is wound inward by at least one revolution from a starting end portion to a terminal end portion of the metal plate along a first surface and a second surface at a side in which a distance between facing surfaces of the metal plate is long so that the terminal end portion reaches a center portion, a lead terminal which is formed at one end portion to protrude in a direction perpendicular to the first surface at the starting end portion of the winding portion, and a contact terminal which is formed at the other end portion to protrude in a direction perpendicular to the second surface at the terminal end portion of the winding portion and to be press-inserted into the first housing while protruding from the bottom surface of the concave portion.

In the first contact 32, a lead terminal (not illustrated) is inserted into a through-hole Ht provided in the first printed circuit board p3 (see FIG. 15) and the lead terminal is bonded to the through-hole Ht by soldering, so that the first contact 32 can be fixed to the first printed circuit board p3.

Referring to FIGS. 16A to 16E, a contact terminal (not illustrated) is press-inserted into a press-insertion hole 31*h* opened to a bottom surface of the concave portion 31*c* from the other surface side of the first housing 31 (the side of the first contact accommodation chamber 31*r*). Accordingly, the first contact 32 can be fixed to the first housing 31 while the contact terminal protrudes from the bottom surface of the concave portion 31*c*.

Referring to FIG. 14 or 15, in the first contact 32, a lead terminal (not illustrated) is fixed to the first printed circuit board p3, a contact terminal (not illustrated) is fixed to the first housing 31, and the lead terminal and the contact terminal are connected to each other by a winding portion (not illustrated). Accordingly, the first contact 32 can movably support the first housing 31 with respect to the first printed circuit board p3.

Configuration of First Housing

Next, a configuration of the first housing 31 according to the second embodiment will be described. Referring to FIG. 14 to FIGS. 16A to 16E, the first housing 31 is desirably formed by an insulator and can be formed into a predetermined rectangular parallelepiped structure by molding a synthetic resin having an insulation property.

The first housing 31 includes a pair of hook-shaped protrusion, that is, hooks 31*f* and 31*f* serving as protrusion portions for regulating the movement amount in the horizontal direction. The hooks 31*f* and 31*f* protrude from the other surface of the first housing 31, that is, a bottom surface of the first housing 31.

Meanwhile, a pair of rectangular regulation holes Hd and Hd to which the pair of hooks 31*f* and 31*f* is locked is opened to the first printed circuit board p3. The regulation hole Hd has a gap with respect to the hook 31*f* inserted thereinto. Here, the regulation hole Hd is formed to be slightly larger than the outer shape of the hook 31*f*.

Referring to FIG. 14 to FIGS. 16A to 16E, the movement amount of the first housing 31 in the horizontal direction with respect to the first printed circuit board p3 is regulated by a gap between the hook 31*f* and the regulation hole Hd in a state where the bottom surface of the first housing 31 contacts or is close to one surface of the first printed circuit board p3. Further, it is possible to exhibit a hook regulation effect with respect to the stronger movement of the first housing 31 in the perpendicular direction.

Operation of Board-to-Board Connector

Next, the operation and effect of the board-to-board connector 20 according to the second embodiment will be described. Referring to FIG. 14 to FIGS. 16A to 16E, the board-to-board connector 20 according to the second embodiment has the same effect as the board-to-board connector 10 according to the first embodiment. Then, the first housing 31 can be further locked to the first printed circuit board p3 by the pair of hooks 31*f* and 31*f*. Accordingly, there is a particular effect of regulating the vertical movement amount of the first housing 31 along with the horizontal movement amount of the first housing 31 with respect to the first printed circuit board p3.

The board-to-board connector according to the invention can be used as a power source connector which supplies power from one connector to the other connector, a first terminal can be used as a positive pole, a second terminal can be used as a negative pole, and a third terminal can be used as a battery terminal. In the board-to-board connector according to the invention, one connector can be used as a floating connector or a movably supported connector with a simple configuration.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A board-to-board connector for electrically connecting a first printed circuit board having a first connector mounted thereon to a second printed circuit board having a second connector mounted thereon, wherein the first connector comprises:

a rectangular parallelepiped first housing which includes a concave portion having one opened surface and fitted to the second connector and a first contact accommodation chamber having the other opened surface; and one or more floating first contacts of which one end portion is fixed to the first printed circuit board, the other end portion is fixed to the first housing, and an intermediate portion is accommodated in the first contact accommodation chamber and in which the first housing is movably supported with respect to the first printed circuit board, wherein the second connector comprises a rectangular parallelepiped second housing which has an insertion hole opened to one surface thereof so that the first contact is insertable into the insertion hole; and wherein the first contact comprises:

a winding portion which includes a band-shaped metal plate, is wound inward by at least one revolution from a starting end portion to a terminal end portion along a first surface and a second surface at a side in which a distance between facing surfaces of the metal plate is long so that the terminal end portion reaches a center portion, and is formed at the intermediate portion;

a lead terminal which forms the one end portion and protrudes in a direction perpendicular to the first surface at the starting end portion of the winding portion; and a contact terminal which forms the other end portion, protrudes in a direction perpendicular to the second surface at the terminal end portion of the winding portion, and is press-inserted into the first housing while protruding from a bottom surface of the concave portion.

2. The board-to-board connector according to claim 1, wherein the first housing further comprises a pair of protrusion portions which protrudes from the other surface, wherein the first printed circuit board further comprises a pair of regulation holes into which the protrusion portions are insertable to have a gap with respect to the protrusion portion inserted thereinto, and wherein the gap regulates a horizontal movement amount of the first housing with respect to the first printed circuit board.

3. The board-to-board connector according to claim 2, wherein the protrusion portion is a boss having an oval cross-section and the regulation hole has a shape larger than the cross-section of the boss.

4. The board-to-board connector according to claim 2, wherein the protrusion portion includes a hook and the regulation hole has a shape larger than an outer shape of the hook.

5. The board-to-board connector according to claim 1, wherein the winding portion includes one or more portions obtained by bending the metal plate between the starting end portion and the terminal end portion.

6. The board-to-board connector according to claim 1, wherein the bending of the metal plate at the winding portion has an angle in the range of 60° to 120°.

7. The board-to-board connector according to claim 1, wherein the winding portion includes one or more portions obtained by curving the metal plate between the starting end portion and the terminal end portion.

8. The board-to-board connector according to claim 1, wherein the winding portion is formed such that the metal plate is flipped outward from the starting end portion and is wound inward to reach the terminal end portion.

9. A board-to-board connector for electrically connecting a first printed circuit board having a first connector mounted thereon to a second printed circuit board having a second connector mounted thereon, wherein the first connector comprises:

a rectangular parallelepiped first housing which includes a concave portion having one opened surface and fitted to the second connector and a first contact accommodation chamber having the other opened surface; and one or more floating first contacts of which one end portion is fixed to the first printed circuit board, the other end portion is fixed to the first housing, and an intermediate portion is accommodated in the first contact accommodation chamber and in which the first housing is movably supported with respect to the first printed circuit board, wherein the second connector comprises:

a rectangular parallelepiped second housing which has an insertion hole opened to one surface thereof so that the first contact is insertable into the insertion hole; and a second contact which is accommodated in the second housing and contacts the first contact, wherein the first contact is formed such that the intermediate portion includes a winding portion obtained by winding a band-shaped metal plate, and wherein the first housing includes a pair of hooks which protrudes from the other surface and the first printed circuit board includes a regulation hole locked to the hook and formed to be larger than an outer shape of the hook.

10. The board-to-board connector according to claim 9, wherein the winding portion is wound inward by at last one revolution from a starting end portion to a terminal end portion along a first surface and a second surface at a side in which a distance between facing surfaces of the band-shaped metal plate is long so that the terminal end portion reaches a center portion of the winding, and wherein the winding portion comprises:

a lead terminal which forms the one end portion and protrudes in a direction perpendicular to the first surface at the starting end portion of the winding portion; and a contact terminal which forms the other end portion, protrudes in a direction perpendicular to the second surface at the terminal end portion of the winding portion, and is press-inserted into the first housing while protruding from a bottom surface of the concave portion.

11. The board-to-board connector according to claim 10, wherein the winding portion includes one or more portions obtained by bending the metal plate between the starting end portion and the terminal end portion.

12. The board-to-board connector according to claim 10, wherein the bending of the metal plate at the winding portion has an angle in the range of 60° to 120°.

13. The board-to-board connector according to claim 10, wherein the winding portion includes one or more portions obtained by curving the metal plate between the starting end portion and the terminal end portion.

14. The board-to-board connector according to claim 10, wherein the winding portion is formed such that the metal plate is flipped outward from the starting end portion and is wound inward to reach the terminal end portion.

* * * * *